(12) United States Patent
Ichikawa et al.

(10) Patent No.: US 8,183,309 B2
(45) Date of Patent: May 22, 2012

(54) PUNCTURE SEALANT

(75) Inventors: Naoya Ichikawa, Kobe (JP); Takaaki Ishida, Kobe (JP); Hiroyuki Nakagawa, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 102 days.

(21) Appl. No.: 12/824,889

(22) Filed: Jun. 28, 2010

(65) Prior Publication Data

US 2010/0331448 A1 Dec. 30, 2010

(30) Foreign Application Priority Data

Jun. 29, 2009 (JP) .................. 2009-154123
Jul. 1, 2009 (JP) .................. 2009-157086

(51) Int. Cl.
*B29C 73/00* (2006.01)
(52) U.S. Cl. ..................... 523/166
(58) Field of Classification Search ........... 523/166
See application file for complete search history.

(56) References Cited

U.S. PATENT DOCUMENTS

| 6,992,119 B2 * | 1/2006 | Kojima et al. ............ 523/166 |
| 2006/0111494 A1 | 5/2006 | Cegelski |
| 2007/0203260 A1 * | 8/2007 | Okamatsu ............ 523/166 |

FOREIGN PATENT DOCUMENTS

| EP | 0 846 552 A2 | 6/1998 |
| EP | 0 988 960 A2 | 3/2000 |
| EP | 2000-103905 A | 4/2000 |
| EP | 1 382 654 A1 | 1/2004 |
| JP | 2000-272022 A | 10/2000 |
| JP | 2001-198986 A | 7/2001 |
| JP | 2002-294214 A | 10/2002 |
| JP | 4074073 B2 | 2/2008 |

* cited by examiner

*Primary Examiner* — Edward Cain
(74) *Attorney, Agent, or Firm* — Birch, Stewart, Kolasch & Birch, LLP

(57) ABSTRACT

The present invention provides a tire puncture sealant including a rubber latex and 1,3-propanediol, which has a reduced viscosity at low temperatures, has better injectability at low temperatures, and is also excellent in storage stability, initial sealing performance, and seal retention performance.

16 Claims, No Drawings

PUNCTURE SEALANT

TECHNICAL FIELD

The present invention relates to a puncture sealant having an improved viscosity at low temperatures in a puncture repair system in which, when a tire goes flat, the puncture sealant and high-pressure air are sequentially injected into the tire through an air valve on the tire wheel. The present invention also relates to a puncture sealant which further prevents clogging of the air valve in the case of the injection at high temperatures.

BACKGROUND ART

As an example of systems for temporarily repairing a flat tire, a system has been known that has a pressure-proof container containing a puncture sealant and a high pressure air source such as a compressor (hereinafter referred also as the integrated system) (see, FIG. 1 of Patent Document 2). In this system, the puncture sealant is injected through an air valve into a tire, and then high-pressure air is continuously injected until the tire is pumped up to a sufficient pressure for driving.

Puncture sealants of this kind prepared by blending a resin tackifier and ethylene glycol with a natural rubber latex have been proposed as described in Patent Documents 1 to 3. In the case of the puncture sealants including a natural rubber latex as a base and ethylene glycol as an antifreezing agent, creaming tends to occur in a long time storage. Therefore, the storage stability (long-term storability) of the puncture sealants needs to be improved.

In order to solve the problem, Patent Document 4 has proposed a puncture sealant in which propylene glycol is used as an antifreezing agent for increasing the stability. Use of propylene glycol in place of ethylene glycol, however, may increase the viscosity of the puncture sealant at low temperatures, occasionally causing difficulties in the injection of the puncture sealant through an air valve at low temperatures. Thus, further improvement is necessary for use of a puncture sealant at substantially low temperatures. Although the fluidity of the puncture sealant can be increased by reducing the amount of the solid components such as rubber particles and a tackifying resin, the puncture sealing performance may then be deteriorated. Further, in the case that a conventional puncture sealant is employed in the integrated system, the puncture sealant may be coagulated in the air valve at high temperatures, and thus the pressure of the tire cannot be increased to a predetermined pressure level.

Patent Document 1: JP-A 2002-294214
Patent Document 2: JP-A 2001-198986
Patent Document 3: JP-A 2000-272022
Patent Document 4: JP-B 4074073

SUMMARY OF THE INVENTION

The present invention aims to provide a tire puncture sealant having a reduced viscosity and improved injectability at low temperatures, excellent storage stability, excellent initial sealing performance, and excellent seal retention performance in order to solve the aforementioned problems. The present invention also aims to provide a tire puncture sealant further having improved injectability at high temperatures.

The present invention relates to a tire puncture sealant including a rubber latex and 1,3-propanediol.

The rubber latex is desirably a natural rubber latex. Further, the natural rubber latex is desirably a deproteinized natural rubber latex.

Desirably, the puncture sealant further includes a tackifier and a nonionic surfactant and the rubber latex is a natural rubber latex.

The nonionic surfactant is desirably a polyoxyalkylene alkyl ether and/or a polyoxyalkylene alkenyl ether.

The nonionic surfactant desirably has an ethylene oxide structure and/or a propylene oxide structure. The average number of moles of added ethylene oxide and propylene oxide is desirably 10 or more.

The polyoxyalkylene alkyl ether desirably has an alkyl group having 10 or more carbon atoms. The polyoxyalkylene alkenyl ether desirably has an alkenyl group having 10 or more carbon atoms.

The nonionic surfactant is desirably at least one member selected from the group consisting of polyoxyethylene stearyl ether, polyoxyethylene lauryl ether, and polyoxyethylene oleyl ether.

The nonionic surfactant desirably has an HLB value of 12 or more.

As, according to the present invention, 1,3-propanediol is added in the tire puncture sealant including a rubber latex, the puncture sealant has storage stability similar to that in the case where propylene glycol is added as an antifreezing agent, and has low-temperature properties similar to those in the case where ethylene glycol is added. Accordingly, a puncture sealant with well-balanced properties can be provided. The tire puncture sealant of the present invention can achieve excellent initial sealing performance and excellent seal retention performance as well.

In the case that, according to one embodiment of the present invention, a nonionic surfactant in addition to 1,3-propanediol is further blended in a tire puncture sealant including a natural rubber latex and a tackifier, the viscosity at low temperatures can be lowered so that the injectability at low temperatures can be improved, and at the same time the injectability at high temperatures can be improved. Further, excellent initial sealing performance, seal retention performance and long-term storability of the puncture sealant are obtained. Therefore, the puncture sealant and air can be favorably injected through the valve core in the integrated puncture repair system at a wide range of temperatures from low to high temperatures.

MODE FOR CARRYING OUT THE INVENTION

The tire puncture sealant according to the present invention includes a rubber latex and 1,3-propanediol.

Examples of the rubber latex include natural rubber latexes and synthetic rubber latexes. According to the present invention, the puncture sealant including a natural rubber latex as a main component is particularly desirable in view of the following performances: for example, the puncture sealant is injected into a tire without clogging the valve; the puncture sealant rapidly fills a puncture hole by running and is solidified by receiving mechanical stimuli from deformation of the tire so that the puncture sealant seals the puncture hole (initial sealing performance); and the sealing performance is maintained to a certain running distance (seal retention performance).

Particularly, a so-called deproteinized natural rubber latex obtained by deproteinizing such a natural rubber latex is more desirably used. This is because the deproteinized natural rubber latex is prevented from decaying with a smaller amount of ammonia, and thereby corrosion damage to steel cords and a pungent odor caused by ammonia are prevented. The deproteinized natural rubber latex can be prepared by, for example, adding a protease to a natural rubber latex in order to degrade the protein, followed by washing, as described in JP-A H10-217344.

Examples of the synthetic rubber latex include butadiene rubber, styrene-butadiene rubber, acrylonitrile-butadiene rubber, ethylene-vinyl acetate rubber, chloroprene rubber, vinyl pyridine rubber, butyl rubber, and modified rubber latexes thereof. Each of the natural rubber latexes and the synthetic rubber latexes may be used alone, or two or more kinds thereof may be used in combination.

The rubber latex is an emulsion in which fine particles of the rubber solid are emulsified and dispersed in an aqueous medium containing a small amount of surfactant as an emulsifier. Rubber latexes to be normally used each have a rubber solid content of approximately 60% by mass.

In the puncture sealant according to the present invention, the amount A of the rubber latex (rubber solid) in the total mass (100% by mass) of the puncture sealant is desirably in the range of 10 to 40% by mass in order to achieve good initial sealing performance and seal retention performance. The lower limit of the amount A is more desirably 15% by mass or more, still more desirably 18% by mass or more, and particularly desirably 20% by mass or more. The upper limit thereof is more desirably 35% by mass or less.

In the case of the puncture sealant including a natural rubber latex, a tackifier, 1,3-propanediol, and a nonionic surfactant, the amount A of the natural rubber latex (rubber solid) in the total mass (100% by mass) of the puncture sealant is desirably in the range of 15 to 40% by mass based on the same considerations as above. The lower limit of the amount A is more desirably 18% by mass or more, and the upper limit thereof is more desirably 35% by mass or less.

The puncture sealant according to the present invention desirably contains a tackifier. The tackifier is used to improve the adhesion between the rubber latex and the tire and thus achieve better puncture sealing performance. As the tackifier, for example, a tackifying resin emulsion (oil-in-water emulsion) in which fine particles of a tackifying resin are emulsified and dispersed in an aqueous medium containing a small amount of an emulsifier can be used. The tackifying resin to be used as the solid component of the tackifying resin emulsion (tackifier) is desirably a resin that does not coagulate the rubber latex, such as terpene resins, phenol resins, and rosin resins. Other examples of the desirable resin include polyvinyl esters, polyvinyl alcohols, and polyvinyl pyrrolidines.

In the puncture sealant according to the present invention, the amount B of the tackifying resin (solid component of the tackifier) in the total mass (100% by mass) of the puncture sealant is desirably 2 to 20% by mass. The lower limit of the amount B is more desirably 3% by mass or more, and still more desirably 4% by mass or more. The upper limit of the amount B is more desirably 15% by mass or less, still more desirably 12% by mass or less, and particularly desirably 10% by mass or less.

In the case of the puncture sealant including a natural rubber latex, a tackifier, 1,3-propanediol, and a nonionic surfactant, the amount B of the tackifying resin (solid component of the tackifier) in the total mass (100% by mass) of the puncture sealant is desirably 2 to 20% by mass. The lower limit of the amount B is more desirably 3% by mass or more, and the upper limit thereof is more desirably 15% by mass or less.

The amount A of the rubber solid of less than 10% by mass and the amount B of the tackifying resin of less than 2% by mass may lead to insufficient puncture sealing performance and insufficient seal retention performance. On the other hand, the amount A exceeding 40% by mass and the amount B exceeding 20% by mass may lead not only to an impairment of the storability including easy coagulation of the rubber particles during the storage but also to a viscosity increase that may hinder the injection of the puncture sealant through the air valve.

Accordingly, in the puncture sealant of the present invention, the sum of the amount A and the amount B (A+B (solids)) in the total mass (100% by mass) of the puncture sealant is desirably in the range of 15 to 60% by mass. The lower limit of the amount A+B (solids) is more desirably 20% by mass or more, still more desirably 25% by mass or more, and particularly desirably 30% by mass or more. The upper limit of the amount A+B is more desirably 50% by mass or less, and still more desirably 45% by mass or less.

In the case of the puncture sealant including a natural rubber latex, a tackifier, 1,3-propanediol, and a nonionic surfactant, the sum of the amount A and the amount B (A+B (solids)) in the total mass (100% by mass) of the puncture sealant is desirably in the range of 20 to 50% by mass. The lower limit of the amount A+B (solids) is more desirably 25% by mass or more, and the upper limit thereof is more desirably 45% by mass or less.

Desirable examples of the emulsifier for the rubber latex and of the emulsifier for the tackifying resin emulsion include surfactants such as anionic surfactants, nonionic surfactants, and cationic surfactants. The total amount of the emulsifiers in the total mass (100% by mass) of the puncture sealant is approximately 0.4 to 2.0% by mass.

According to the present invention, 1,3-propanediol is used as an antifreezing agent. Use of 1,3-propanediol in place of propylene glycol (1,2-propanediol) suppresses the viscosity increase at low temperatures and thus can improve the injectability of the puncture sealant at low temperatures. Therefore, the puncture sealant can be used at a further lower temperature as well. Accordingly, clogging of the valve core during the injection of the puncture sealant and air through the valve core can be prevented in the integrated puncture repair system even at low temperatures. This is presumably because as follows: "1,3-" propanediol has hydroxy groups (—OH) at the first and third carbon atoms and has a smaller dipole moment than "1,2-" propanediol; thereby, 1,3-propanediol has a lower hydrogen bond strength, resulting in lower viscosity.

Addition of an antifreezing agent in a puncture sealant may in some cases deteriorate the stability of the rubber particles and thus cause coagulation of the particles. However, the puncture sealant including 1,3-propanediol according to the present invention suppresses coagulation of the rubber particles and the tackifier particles on and near the surface of the puncture sealant, thus preventing their change to creamy substances in a long-term storage. Excellent storability (storage stability) can thus be achieved. Therefore, use of 1,3-propanediol improves the storage stability as compared with use of ethylene glycol, and at the same time improves the low-temperature properties as compared with use of propylene glycol, thereby making it possible to achieve good storage stability and good low-temperature properties in a well-balanced manner. These effects can be obtained only by use of 1,3-propanediol. Use of other compounds such as butanediol as an antifreezing agent causes problems such as viscosity increase.

Moreover, use of 1,3-propanediol provides a favorable antifreezing effect. Furthermore, since the amount of the antifreezing agent can be reduced to a minimum, it is possible to prevent negative influences of the antifreezing agent on other performances of the puncture sealant, such as puncture sealing performance.

In the puncture sealant of the present invention, the amount C of the 1,3-propanediol in the total mass (100% by mass) of the puncture sealant is desirably 20 to 70% by mass. The amount C of less than 20% by mass may increase the viscosity at low temperatures. On the other hand, the amount C exceeding 85% by mass may reduce the puncture sealing performance due to the reduced solid content in the puncture sealant. The lower limit of the amount C is more desirably 25% by mass or more, still more desirably 30% by mass or more, and particularly desirably 35% by mass or more. The upper limit of the amount C is more desirably 65% by mass or less, still more desirably 60% by mass or less, and further desirably 55% by mass or less.

In the case of the puncture sealant including a natural rubber latex, a tackifier, 1,3-propanediol, and a nonionic surfactant, the amount C of the 1,3-propanediol in the total mass (100% by mass) of the puncture sealant is desirably 20 to 64% by mass. The amount C of less than 20% by mass or exceeding 64% by mass may cause problems similar to those described earlier. The lower limit of the amount C is more desirably 25% by mass or more, and the upper limit thereof is more desirably 55% by mass or less.

In the puncture sealant of the present invention, the amount C' of the 1,3-propanediol in 100% by mass of a liquid portion of the puncture sealant is desirably 50 to 85% by mass. The amount C' of less than 50% by mass or exceeding 85% by mass may increase the viscosity at low temperatures. The lower limit of the amount C' is more desirably 55% by mass or more. On the other hand, the upper limit thereof is more desirably 80% by mass or less, and still more desirably 70% by mass or less. The "liquid portion of the puncture sealant" used herein refers to water and an antifreezing agent such as 1,3-propanediol. Accordingly, the amount C' is a value obtained by the following calculation: (mass of 1,3-propanediol)/(total mass of water and antifreezing agent)×100 (% by weight).

In the case of the puncture sealant including a natural rubber latex, a tackifier, 1,3-propanediol, and a nonionic surfactant, the amount C' of the 1,3-propanediol in 100% by mass of a liquid portion of the puncture sealant is desirably 50 to 80% by mass. The amount C' of less than 50% by mass may increase the viscosity at low temperatures, especially at a temperature of −30° C. or lower. On the other hand, the amount C' exceeding 80% by mass may reduce the antifreezing performance and even increase the viscosity at low temperatures, thus leading to deterioration of the injectability of the puncture sealant. The lower limit of the amount C' is more desirably 55% by mass or more, and the upper limit of the amount C' is more desirably 70% by mass or less.

Nonionic surfactants are desirably used in the present invention. In the case of the puncture sealant including 1,3-propanediol in addition to a natural rubber latex and a tackifier, for example, clogging problems may occur when it is used at high temperatures. The clogging at high temperatures occurs as follows. After injection of the puncture sealant, a portion of the puncture sealant adhered on the inner wall of a bottle or a hose is dried to be in a rubbery state due to contact with warm air during injection of high-pressure air. The rubbery puncture sealant portions accumulate in narrow spaces (valve core and valve insert) of the flow path and clog the path. In accordance with the present invention, addition of the nonionic surfactant improves the injectability at high temperatures, and thus the clogging can be prevented from occurring at high temperatures. This is presumably because as follows: the nonionic surfactant is allowed to be adsorbed on the natural rubber particles which are dispersed by the ionic repulsion of the anionic surfactant; the interparticle potential energy around the particles increases; thus, the thermal stability of the puncture sealant is improved. This effect can be exerted by use of the nonionic surfactant. Use of a cationic surfactant or an anionic surfactant may cause an increase in the viscosity of the puncture sealant.

Use of the nonionic surfactant can provide excellent initial sealing performance, seal retention performance and storage stability as well.

The nonionic surfactant is desirably a polyoxyalkylene alkyl ether and/or a polyoxyalkylene alkenyl ether. Use of these nonionic surfactants effectively improves the injectability at high temperatures.

The nonionic surfactant such as a polyoxyalkylene alkyl ether or a polyoxyalkylene alkenyl ether desirably has an ethylene oxide structure and/or a propylene oxide structure. The nonionic surfactant having an ethylene oxide structure and/or a propylene oxide structure as a hydrophilic group can have increased compatibility with 1,3-propanediol. Particularly desirably, the nonionic surfactant has an ethylene oxide structure. In the nonionic surfactant having an ethylene oxide structure and/or a propylene oxide structure, the average number of moles of the added ethylene oxide (EO) and propylene oxide (PO) (sum of the average number of moles of added EO and PO) is one or more, desirably 10 or more, and more desirably 13 or more. The average number of the added moles is desirably 80 or less, more desirably 60 or less, and still more desirably 40 or less. In these cases, the compatibility can be increased and the injectability at high temperatures can be improved.

The number of carbon atoms of the alkyl group in the polyoxyalkylene alkyl ether, and the number of carbon atoms of the alkenyl group in the polyoxyalkylene alkenyl ether each are desirably 4 or more, more desirably 8 or more, still more desirably 10 or more, and particularly desirably 12 or more. The numbers of carbon atoms each are desirably 24 or less, more desirably 22 or less, still more desirably 20 or less, and particularly desirably 18 or less. In these cases, the injectability at high temperatures can be effectively improved.

Examples of the polyoxyalkylene alkyl ether and of the polyoxyalkylene alkenyl ether include a compound represented by the formula (1) below. Use of the compound not only can improve the injectability at high temperatures but can achieve excellent initial sealing performance, seal retention performance, and storage stability as well.

$$R^1\text{—O-(AO)}_n\text{—H} \qquad (1)$$

(In the formula (1), $R^1$ represents a $C_4$-$C_{24}$ alkyl group or a $C_4$-$C_{24}$ alkenyl group. The average number of added moles "n" is 1 to 80. Each AO may be the same as or different from each other and represents a $C_2$-$C_4$ oxyalkylene group.)

The number of carbon atoms of $R^1$ is desirably 8 or more, more desirably 10 or more, and still more desirably 12 or more. The number of carbon atoms of $R^1$ is desirably 22 or less, more desirably 20 or less, and still more desirably 18 or less.

Desirably, n is 10 or more, and more desirably 13 or more. Desirably, n is 60 or less, more desirably 50 or less, and still more desirably 40 or less.

The AO is desirably a $C_2$-$C_3$ oxyalkylene group (oxyethylene group (EO) or oxypropylene group (PO)). In the case that the $(AO)_n$ includes two or more kinds of oxyalkylene groups, the oxyalkylene groups may be arranged in a block form or a random form. In the case that each of $R^1$ and n is in the foregoing range, or that the AO is EO or PO, the effects of the present invention are favorably exerted.

As the polyoxyalkylene alkyl ether or the polyoxyalkylene alkenyl ether, a compound represented by the following formula (2) is desirably used.

$$R^2—O-(EO)_x(PO)_y—H \qquad (2)$$

(In the formula (2), $R^2$ represents a $C_8$-$C_{22}$ alkyl group or a $C_8$-$C_{22}$ alkenyl group. EO represents an oxyethylene group, and PO represents an oxypropylene group. The average number of added moles "x" is 1 to 60. The average number of added moles "y" is 0 to 20.)

The number of carbon atoms of $R^2$ is desirably in the same range as that of the $R^1$. $R^2$ may be linear or branched, but is desirably a linear alkyl group or a linear alkenyl group. Desirably, x is 10 or more, and more desirably 13 or more. Also, x is desirably 50 or less, and more desirably 40 or less. Desirably, y is 10 or less, more desirably 4.5 or less, and still more desirably 2.0 or less. Also, y may be 0. In the case that each $R^2$, x, and y is in the foregoing range, the effects of the present invention are favorably exerted.

The EO and the PO may be arranged in a block form or in a random form. In the case that the EO and the PO are arranged in a block form, the number of the block of EO and the number of the block of PO each may be one or more, as long as each of the average numbers of the added moles is in the foregoing range. In the case that the number of the block of EO is two or more, the number of repetition of the EO in each block may be the same or different. Also, in the case that the number of the block of PO is two or more, the number of repetition of the PO in each block may be the same or different. In the case that the EO and the PO are arranged in a random form, the EO and the PO may be alternately arranged or randomly arranged as long as each of the average numbers of the added moles is in the foregoing range.

In consideration of the injectability at high temperatures, desirable examples of the nonionic surfactant to be used in the present invention include polyoxyethylene alkyl ethers and polyoxyethylene alkenyl ethers (for example, compounds represented by the formula (2), wherein y=0). In these nonionic surfactants, the desirable average number of added moles of EO, the desirable alkyl group, and the desirable alkenyl group are the same as those described above.

Examples of the polyoxyalkylene alkyl ether and of the polyoxyalkylene alkenyl ether include polyoxyethylene stearyl ether, polyoxyethylene oleyl ether, polyoxyethylene cetyl ether, polyoxyethylene myristyl ether, polyoxyethylene lauryl ether, polyoxyethylene polyoxypropylene stearyl ether, polyoxyethylene polyoxypropylene oleyl ether, polyoxyethylene polyoxypropylene cetyl ether, polyoxyethylene polyoxypropylene myristyl ether, and polyoxyethylene polyoxypropylene lauryl ether. In consideration of the injectability at high temperatures, polyoxyethylene stearyl ether, polyoxyethylene oleyl ether, and polyoxyethylene lauryl ether are desirable among the above examples.

The HLB (Hydrophilic-lipophilic balance) value (calculated by Griffin's method) of the nonionic surfactants such as polyoxyalkylene alkyl ethers and polyoxyalkylene alkenyl ethers is desirably 12 or more, and more desirably 13 or more. The HLB value is desirably 19 or less, and more desirably 17 or less. These desirable HLB values can increase the compatibility and improve the stability at high temperatures, leading to better storability and better injectability at high temperatures. Moreover, it is also possible to achieve excellent puncture sealing performance, seal retention performance and low-temperature properties.

Examples of the commercially available nonionic surfactants include Emulgen 320P (formula (2): $R^2$=stearyl group, x=13, y=0), Emulgen 420 (formula (2): $R^2$=oleyl group, x=20, y=0), Emulgen 430 (formula (2): $R^2$=oleyl group, x=30, y=0), Emulgen 150 (formula (2): $R^2$=lauryl group, x=40, y=0), Emulgen 109P (formula (2): $R^2$=lauryl group, x=9, y=0), Emulgen 120 (formula (2): $R^2$=lauryl group, x=12, y=0), and Emulgen 220 (formula (2): $R^2$=cetyl group, x=12, y=0) (all produced by Kao Corporation).

The amount D of the nonionic surfactant in the total mass (100% by mass) of the puncture sealant is desirably 1 to 12% by mass. The amount D of less than 1% by mass may not provide sufficient clogging-prevention effects at high temperatures. On the other hand, the amount D exceeding 12% by mass may result in insufficient sealing properties and increase the viscosity at room temperature. The lower limit of the amount D is more desirably 1.5% by mass or more, and the upper limit of the amount D is more desirably 10% by mass or less. Here, the amount D is a value that does not include the amount of nonionic surfactant as emulsifier in the rubber latex and the tackifying resin emulsion.

The amount D' of the nonionic surfactant in 100% by mass of the surfactant(s) in the puncture sealant is desirably 30% by mass or more, and more desirably 40% by mass or more. The desirable amount D' can effectively improve the injectability at high temperatures.

The sum of the amount C and the amount D (C+D) in the total mass (100% by mass) of the puncture sealant is desirably 34 to 65% by mass in consideration of: achieving a good balance between lowering of the freezing point and prevention of viscosity increase at low temperatures, thereby extending the applicable temperature range to lower temperatures; improving the injectability at high temperatures; and securing the stability of the puncture sealant. The lower limit of the amount C+D is more desirably 36% by mass or more, and the upper limit thereof is more desirably 62% by mass or less.

The puncture sealant of the present invention may further contain other ingredients as long as the effects of the present invention are not inhibited.

The puncture sealant of the present invention is produced by a usual method. That is, the puncture sealant can be produced by, for example, mixing of each of the foregoing ingredients in conventional manners.

EXAMPLES

The present invention will be specifically described based on examples; however, the present invention is not limited thereto.

Production Example 1

A protease from bacteria was added to a field latex (solid content: 30% by mass) and allowed to stand at 40° C. for 24 hours to give a protein-degraded field latex. The resulting field latex was purified with a rotary flat membrane separator according to the method described in JP-B 3350593 and concentrated until the solid content reached 60% by mass, thereby providing a deproteinized natural rubber latex.

Examples 1 to 7, and Comparative Examples 1 to 4

Each puncture sealant was produced using a commercially available natural rubber latex (HA natural rubber latex made in Malaysia (rubber solid content: 60% by mass))), the prepared deproteinized natural rubber latex, a carboxy-modified styrene-butadiene rubber (SBR) latex or a butadiene rubber (BR) latex based on the formulation shown in Table 1.

The carboxy-modified styrene-butadiene rubber (SBR) latex, the butadiene rubber (BR) latex and the tackifier used are as follows.

Tackifier: Terpene resin emulsion (solid content: about 50% by mass)

Carboxy-modified SBR latex: Nipol LX426 (produced by Zeon Corporation, solid content: about 50% by mass)

BR Latex: Nipol LX111 A2 (produced by Zeon Corporation, solid content: about 54% by mass)

amount of a creamy substance generated was measured and expressed in a mass ratio (%) relative to the whole amount of the puncture sealant.

(4) Viscosity at Low Temperature (−40° C.)

The viscosity of the puncture sealant at −40° C. was measured with a Type B viscometer (Brookfield viscometer).

TABLE 1

|  |  | Example 1 | Example 2 | Example 3 | Example 4 | Example 5 | Example 6 | Example 7 | Comparative Example 1 | Comparative Example 2 | Comparative Example 3 | Comparative Example 4 |
|---|---|---|---|---|---|---|---|---|---|---|---|---|
| Natural rubber latex (Solid content: 60% by mass) | | 50 (30) | 40 (24) | 30 (18) | — | — | 20 (12) | — | 50 (30) | 50 (30) | — | — |
| Deproteinized natural rubber latex (Solid content: 60% by mass) | | — | — | — | 50 (30) | — | — | — | — | — | — | — |
| Carboxy-modified SBR latex (Solid content: 50% by mass) | | — | — | — | — | 45 (22.5) | 25 (12.5) | — | — | — | 45 (22.5) | 45 (22.5) |
| BR latex (Solid content: 54% by mass) | | — | — | — | — | — | — | 40 (21.6) | — | — | — | — |
| Tackifier (Solid content: 50% by mass) | | 10 (5) | 10 (5) | 10 (5) | 10 (5) | 10 (5) | 10 (5) | 10 (5) | 10 (5) | 10 (5) | 10 (5) | 10 (5) |
| 1,3-propanediol | | 40 | 50 | 60 | 40 | 45 | 45 | 50 | — | — | — | — |
| Propylene glycol | | — | — | — | — | — | — | — | 40 | — | 45 | — |
| Ethylene glycol | | — | — | — | — | — | — | — | — | 40 | — | 45 |
| Solid content (g) | | 35 | 29 | 23 | 35 | 27.5 | 29.5 | 26.6 | 35 | 35 | 27.5 | 27.5 |
| Water content (g) | | 25 | 21 | 17 | 25 | 27.5 | 25.5 | 23.4 | 25 | 25 | 27.5 | 27.5 |
| Amount of anti-freezing agent (g) | | 40 | 50 | 60 | 40 | 45 | 45 | 50 | 40 | 40 | 45 | 45 |
| Proportion of anti-freezing agent in liquid components (% by mass) | | 61.5 | 70.4 | 77.9 | 61.5 | 62.1 | 63.8 | 68.1 | 61.5 | 61.5 | 62.1 | 62.1 |
| Results | Puncture sealing performance | A | A | A | A | A | A | A | A | A | A | A |
| | Seal retention performance | A | A | A | A | A | A | A | A | A | A | A |
| | Storability (%) | 11 | 12 | 12 | 11 | 10 | 11 | 10 | 12 | 16 | 11 | 16 |
| | Viscosity at −40° C. (cps) | 6000 | 5000 | 3800 | 6100 | 5900 | 5100 | 4900 | frozen | 5200 | frozen | 4700 |

Each of the obtained puncture sealants was evaluated for puncture sealing performance, seal retention performance, storability (storage stability), and the viscosity at a low temperature (−40° C.) according to the methods below. Table 1 shows the results.

(1) Puncture Sealing Performance

A puncture hole was made in a tire of size 185/65R14 by a nail 4.0 mm in diameter. After removal of the nail, the puncture sealant in an amount of 500 ml was injected into the tire, and air pressure was applied up to 200 kPa. After the tire was made to rotate for 10 minutes at a load of 3.5 kN on a drum, whether the puncture hole was sealed or not was evaluated. The results were expressed on a two-point scale of A (sealed) and B (not sealed).

(2) Seal Retention Performance

The tire was also checked for the leakage of air from the puncture hole during 100 km running after the sealing. The results were expressed on a two-point scale of A (no air leakage occurred) and B (air leakage occurred).

(3) Storability (Storage Stability)

The prepared puncture sealant in an amount of 500 ml was placed in a bottle-shaped container, and allowed to stand still in an oven at 80° C. for two months. After the storage, the As shown in Table 1, the low-temperature properties were poor in Comparative Examples 1 and 3 in which propylene glycol was used as an antifreezing agent; and the storability was poor in Comparative Examples 2 and 4 in which ethylene glycol was used as an antifreezing agent. On the other hand, the puncture sealants in Examples using 1,3-propanediol were excellent in both the low-temperature properties and the storability. In Examples, the puncture sealing performance and seal retention performance were also excellent.

Examples 8 to 23

Each puncture sealant was produced using a commercially available natural rubber latex (HA natural rubber latex made in Malaysia (rubber solid content: 60% by mass)) or the above-obtained deproteinized natural rubber latex based on the formulations described in Tables 2 and 3.

The tackifier and the surfactants used are as follows.

Tackifier: Terpene resin emulsion (solid content: about 50% by mass)

Emulgen 320P: Polyoxyethylene stearyl ether (formula (2): $R^2$=stearyl group, x=13, y=0; HLB value=13.9; produced by Kao Corporation)

Emulgen 420: Polyoxyethylene oleyl ether (formula (2): $R^2$=oleyl group, x=20, y=0; HLB value=13.6; produced by Kao Corporation)

Emulgen 430: Polyoxyethylene oleyl ether (formula (2): $R^2$=oleyl group, x=30, y=0; HLB value=16.2; produced by Kao Corporation)

Emulgen 150: Polyoxyethylene lauryl ether (formula (2): $R^2$=lauryl group, x=40, y=0; HLB value=18.4; produced by Kao Corporation)

Emal 270J: Sodium polyoxyethylene lauryl ether sulfate (produced by Kao Corporation)

Emal 2FG: Sodium lauryl sulfate (produced by Kao Corporation)

Each of the obtained puncture sealants was evaluated for the injectability at high temperatures, puncture sealing performance, seal retention performance, storability (storage stability), and the viscosity at low temperatures (−30° C., −40° C.) according to the methods below. Tables 2 and 3 show the results.

(1) Injectability at High Temperatures

The puncture sealant was injected into a tire with an integrated puncture repair system at a temperature of 50° C. Whether the tire pressure was increased to a predetermined level or not was evaluated, and the results were expressed on a two-point scale of A (increased) and B (not increased).

(2) Puncture Sealing Performance

A puncture hole was made in a tire of size 185/65R14 by a nail 4.0 mm in diameter. After removal of the nail, the puncture sealant in an amount of 500 ml was injected into the tire, and air pressure was applied up to 200 kPa. Thereafter, the tire was made to rotate at a load of 3.5 kN on a drum. The time required for sealing the puncture hole was determined based on the amount of air leakage. The results were expressed as indexes on a five-point scale relative to the index value of a conventional product regarded as 3. A larger value indicates a better performance.

(3) Seal Retention Performance

The tire was also checked for the leakage of air from the puncture hole during 100 km running after the sealing. The results were expressed on a two-point scale of A (no air leakage occurred) and B (air leakage occurred).

(4) Storability (Stability with Time)

After the prepared puncture sealant was allowed to stand for 10 days at a temperature of 70° C., the change in state of the puncture sealant was visually evaluated. The results were expressed on a four-point scale of S (remained liquid), A (changed to slightly creamy), B (changed to creamy), and C (solidified).

(5) Viscosity at Low Temperatures (−30° C. and −40° C.)

The viscosity of the puncture sealant at −30° C. and −40° C. was measured with a Type B viscometer (Brookfield viscometer).

TABLE 2

|  |  | Example 8 | Example 9 | Example 10 | Example 11 | Example 12 | Example 13 | Example 14 | Example 15 |
|---|---|---|---|---|---|---|---|---|---|
| Commercially available natural rubber latex (solid rubber content) | | 55 (33) | 55 (33) | 55 (33) | 55 (33) | 55 (33) | 55 (33) | 55 (33) | 55 (33) |
| Tackifier (solid content) | | 13 (6.5) | 9 (4.5) | 5 (2.5) | 13 (6.5) | 13 (6.5) | 13 (6.5) | 13 (6.5) | 13 (6.5) |
| 1,3-propanediol | | 30 | 30 | 30 | 30 | 30 | 30 | 30 | 30 |
| Emulgen 320P | | 2 | 6 | 10 | — | — | — | — | — |
| Emulgen 420 | | — | — | — | 2 | — | — | — | — |
| Emulgen 430 | | — | — | — | — | 2 | — | — | — |
| Emulgen 150 | | — | — | — | — | — | 2 | — | — |
| Emal 270J | | — | — | — | — | — | — | 2 | — |
| Emal 2FG | | — | — | — | — | — | — | — | 2 |
| Results | Injectability at high temperature | A | A | A | A | A | A | B | B |
| | Puncture sealing performance | 3 | 3 | 3 | 3 | 3 | 3 | 3 | 3 |
| | Seal retention performance | A | A | A | A | A | A | A | A |
| | Storability | A | A | A | A | A | A | A | A |
| | Viscosity at −30° C. (cps) | 730 | 870 | 1050 | 660 | 590 | 890 | 1210 | 1400 |
| | Viscosity at −40° C. (cps) | 2340 | 2780 | 3360 | 2110 | 1890 | 2850 | 3800 | 4480 |

TABLE 3

|  |  | Example 16 | Example 17 | Exmaple 18 | Example 19 | Example 20 | Example 21 | Example 22 | Example 23 |
|---|---|---|---|---|---|---|---|---|---|
| Deproteinized natural rubber latex (solid rubber content) | | 55 (33) | 55 (33) | 55 (33) | 55 (33) | 55 (33) | 55 (33) | 55 (33) | 55 (33) |
| Tackifier (solid content) | | 13 (6.5) | 9 (4.5) | 5 (2.5) | 12 (6.0) | 12 (6.0) | 12 (6.0) | 10 (5.0) | 10 (5.0) |
| 1,3-propanediol | | 30 | 30 | 30 | 30 | 30 | 30 | 30 | 30 |
| Emulgen 320P | | 2 | 6 | 10 | — | — | — | — | — |
| Emulgen 420 | | — | — | — | 2 | — | — | — | — |
| Emulgen 430 | | — | — | — | — | 2 | — | — | — |
| Emulgen 150 | | — | — | — | — | — | 2 | — | — |
| Emal 270J | | — | — | — | 1 | — | — | 5 | — |
| Emal 2FG | | — | — | — | — | 1 | 1 | — | 5 |
| Results | Injectability at high temperature | A | A | A | A | A | A | B | B |
| | Puncture sealing performance | 3 | 3 | 3 | 3 | 3 | 3 | 3 | 3 |

TABLE 3-continued

|  | Example 16 | Example 17 | Exmaple 18 | Example 19 | Example 20 | Example 21 | Example 22 | Example 23 |
|---|---|---|---|---|---|---|---|---|
| Seal retention performance | A | A | A | A | A | A | A | A |
| Storability | A | A | A | A | A | A | A | A |
| Viscosity at −30° C. (cps) | 710 | 850 | 1280 | 890 | 980 | 1010 | 1130 | 1090 |
| Viscosity at −40° C. (cps) | 2270 | 2720 | 4100 | 2850 | 3140 | 3200 | 3630 | 3490 |

As shown in Tables 2 to 3, the puncture sealants prepared in Examples 8 to 13, and 16 to 21, each of which included a nonionic surfactant and 1,3-propanediol, showed a significant reduction in the viscosity at low temperatures while ensuring the puncture sealing performance, seal retention performance and storability. Moreover, the injectability at high temperatures was good as well. Accordingly, use of these puncture sealants enables favorable use of the integrated puncture repair system at a wide range of temperatures from low to high temperatures. The puncture sealants prepared in Examples 14 to 15, and 22 to 23, each of which included an anionic surfactant and 1,3-propanediol, showed good puncture sealing performance, seal retention performance and storability, though the injectability at high temperatures tended to be decreased. Therefore, these latter puncture sealants are applicable for use where those performances (i.e. puncture sealing performance, seal retention performance and storability) are required.

The invention claimed is:

1. A tire puncture sealant, comprising: a rubber latex; and 1,3-propanediol.

2. The tire puncture sealant according to claim 1, wherein the rubber latex is a natural rubber latex.

3. The tire puncture sealant according to claim 2, wherein the natural rubber latex is a deproteinized natural rubber latex.

4. The tire puncture sealant according to claim 2, further comprising: a tackifier; and a nonionic surfactant.

5. The tire puncture sealant according to claim 4, wherein the nonionic surfactant is a polyoxyalkylene alkyl ether and/or a polyoxyalkylene alkenyl ether.

6. The tire puncture sealant according to claim 4, wherein the nonionic surfactant has an ethylene oxide structure and/or a propylene oxide structure.

7. The tire puncture sealant according to claim 6, wherein the average number of moles of added ethylene oxide and propylene oxide is 10 or more.

8. The tire puncture sealant according to claim 5, wherein the polyoxyalkylene alkyl ether has an alkyl group having 10 or more carbon atoms.

9. The tire puncture sealant according to claim 5, wherein the polyoxyalkylene alkenyl ether has an alkenyl group having 10 or more carbon atoms.

10. The tire puncture sealant according to claim 4, wherein the nonionic surfactant is at least one member selected from the group consisting of polyoxyethylene stearyl ether, polyoxyethylene lauryl ether, and polyoxyethylene oleyl ether.

11. The tire puncture sealant according to claim 4, wherein the nonionic surfactant has an HLB value of 12 or more.

12. The tire puncture sealant according to claim 1, wherein the rubber latex (rubber solid) is present in an amount of 10 to 40% by mass and the 1,3-propanediol is present in an amount of 20 to 70% by mass, based upon the total mass (100% by mass) of the tire puncture sealant.

13. The tire puncture sealant according to claim 1, wherein the 1,3-propanediol is present in an amount of 50 to 85% by mass, based upon the total mass (100% by mass) of a liquid portion of the puncture sealant.

14. The tire puncture sealant according to claim 4, wherein the nonionic surfactant is present in an amount of 1 to 12% by mass, based upon the total mass (100% by mass) of the puncture sealant.

15. The tire puncture sealant according to claim 4, wherein the nonionic surfactant is present in an amount of 30% by mass or more, based on 100% by mass of the surfactant in the puncture sealant.

16. A tire puncture sealant which comprises as components,
   10-40% by mass of a rubber latex;
   20-70% by mass of 1,3-propanediol;
   2-20% by mass of a tackifier, and
   1-12% by mass of a nonionic surfactant, the amount of said components being based upon the total mass (100% by mass) of the tire puncture sealant.

* * * * *